United States Patent Office 2,795,585
Patented June 11, 1957

2,795,585
PRODUCTION OF DYESTUFFS OF THE PHTHALOCYANINE SERIES

Fritz Muehlbauer, Ludwigshafen (Rhine), Germany, assignor to Badische Anilin- & Soda-Fabrik Aktiengesellschaft, Ludwigshafen (Rhine), Germany No Drawing. Application May 21, 1954,
Serial No. 431,606

Claims priority, application Germany May 23, 1953

8 Claims. (Cl. 260—314.5)

This invention relates to new valuable dyestuffs of the phthalocyanine series.

It is already known that the corresponding phthalocyanine sulfonamides are obtained by the reaction of phthalocyanine sulfochlorides with ammonia or amines. These dyestuffs are usually blue and it is only with aromatic amines that in some cases greenish-blue dyestuffs are obtained.

I have now found that especially valuable green dyestuffs of the phthalocyanine series are obtained by reacting phthalocyanine sulfochlorides with 4-amino-4'-nitrodiphenylamine-2'-sulfonic acid. The preparation of 4-amino-4'-nitro diphenylamine-2'-sulfonic acid is shown in Ber. vol. 41 pages 3752–3 (1908).

There may be used for the reaction not only sulfochlorides of metal-free phthalocyanine but also sulfochlorides of metal-containing phthalocyanines, such as those of copper, cobalt, nickel, iron, chromium, aluminum, zinc or tin, which can be obtained by treatment of the phthalocyanines with chlorosulfonic acid. The initial materials can contain one to four sulfochloride groups and the reaction can be carried out so that all the sulfochloride groups are converted into sulfonamido groups or so that only some of the sulfochloride groups are converted into sulfonamido groups and the remaining free sulfochloride groups converted into sulfonic acid groups and their ammonium, sodium or potassium salts respectively. In this way clear, pale bluish-green to deep yellowish-green dyestuffs are obtained.

It is surprising that the new green dyestuffs should be extremely clear and fast having regard to the fact that the amine used for the reaction is itself deep brown in color and of very bad fastness. The new dyestuffs are soluble both in water and in organic solvents and are therefore suitable for dyeing leather and paper and also for coloring varnish lacquers. With heavy metal salts, such as salts of calcium, strontium, barium, aluminum, manganese or iron, there are obtained therefrom water-insoluble color lakes which can be used as pigment dyestuffs.

The following examples will further illustrate this invention but the invention is not restricted to these examples. The parts are by weight.

Example 1

A mixture of 420 parts of copper phthalocyanine and 3000 parts of chlorosulfonic acid is heated for 4 hours at 135° to 140° C. while stirring. After cooling to 30° C., the sulfochlorination mixture is introduced into a mixture of 25,000 parts of ice and 25,000 parts of water in such a way that the temperature does not exceed 0° C. The deposited dyestuff is allowed to settle and the supernatant dilute acid is siphoned off. The dyestuff itself is filtered off by suction and washed with 5000 parts of cold water. There are thus obtained 3350 parts of an aqueous paste of a mixture of copper phthalocyanine tri- and tetra-sulfochlorides having the pH 1.9 which is adjusted to about the pH 5.7 by the addition of a solution of 100 parts of ammonium carbonate in 50 parts of water.

Into 500 parts of the resultant copper phthalocyanine sulfochloride paste there is introduced while stirring a deep brown solution of 30.7 parts of 4-amino-4'-nitrodiphenylamine-2'-sulfonic acid in a mixture of 80 parts of water and 27 parts of 25% ammonia (pH 8.2). The temperature of the reaction mixture thus rises to 15° to 20° C. and after about half an hour the reaction mixture becomes so thick that it can no longer be stirred. The resultant dyestuff paste is evaporated and dried. 145 parts of a dyestuff are obtained which dyes both leather and paper and also varnish lacquer clear bluish-green shades of great color strength and very good fastness. According to analysis, only one sulfochloride group has reacted with the amine to form the amide, while the remaining sulfochloride groups have been saponified to sulfonic acid groups which form their ammonium salts. If, stead of ammonia, an aqueous solution of sodium or potassium carbonates or of ethanolamine or diethylamine are used, there are obtained the corresponding salts.

Example 2

Into 1000 parts of the paste of phthalocyanine polysulfochloride prepared according to paragraph 1 of Example 1 there is stirred at 8° C. a solution of 185 parts of 4-amino-4'-nitrodiphenylamine-2'-sulfonic acid in a mixture of 440 parts of water and 90 parts of 25% ammonia. To this reaction mixture (pH 5.9), after stirring for about half an hour, there are added while stirring 36 parts of 25% ammonia and the whole stirred further for some hours, the reaction mixture becoming rather thick and acquiring a pH value of 8.3. After drying this dyestuff paste, 445 parts of a dark green powder are obtained which dissolves readily in water or varnish lacquer with a deep yellow-green color. It is especially suitable for dyeing chrome leather or vegetable-tanned leather, which it dyes bright yellow-green shades of very high fastness to light.

According to analysis, the dyestuff contains three substituted sulfonamido groups and one free sulfonic acid group.

By choosing other amounts of 4-amino-4'-nitrodiphenylamine-2'-sulfonic acid, only two of the sulfochloride groups, or also four thereof, may be converted into the corresponding sulfonamido groups. With an increasing number of substituted sulfonamido groups, from bluish-green to bright yellow-green dyestuffs are obtained.

Example 3

A mixture of 120 parts of cobalt phthalocyanine and 800 parts of chlorosulfonic acid is heated at 115° C. for 1 hour while stirring. The sulfochlorination mixture, after cooling to 30° C., is introduced into a mixture of 5000 parts of ice and 5000 parts of water at 0° C., the deposited dyestuff is filtered off by suction, washed with 1000 parts of ice water and the remaining aqueous dyestuff paste adjusted to the pH 7.4 at 5° C. with a solution of 120° parts of ammonium carbonate in 60 parts of water; 1100 parts of an aqueous paste of cobalt phthalocyanine disulfochloride are obtained.

A solution of 31 parts of 4-amino-4'-nitrodiphenylamine-2'-sulfonic acid in a mixture of 300 parts of water and 30 parts of ammonium carbonate, to which a few drops of ammonia have been added, is introduced into 550 parts of the said paste and the whole, which has a pH of 7.4, stirred at about 20° C. for several hours and then evaporated to dryness. There are obtained 115 parts of a black-blue powder which dissolves in water with a green color and is eminently suitable for dyeing leather and paper.

If 62 parts of 4-amino-4'-nitrodiphenylamine-2'-sulfonic acid are used for the reaction, 180 parts of a dyestuff are obtained which dyes varnish lacquer, leather or paper yellowish-green shades.

*Example 4*

A mixture of 110 parts of aluminum phthalocyanine and 800 parts of chlorosulfonic acid is heated at 135° to 140° C. for 4 hours while stirring. After working up in conventional manner, a dyestuff paste of aluminum phthalocyanine tetrasulfochloride adjusted with ammonium carbonate to a pH of about 7 is obtained.

Into this dyestuff paste there is then introduced while stirring a solution of 186 parts of 4-amino-4'-nitrodiphenylamine-2'-sulfonic acid in a mixture of 450 parts of water and 90 parts of 25% ammonia, the pH is adjusted to about 8 by addition of 36 parts of 25% ammonia and the whole heated further for some hours. The dyestuff paste which has thereby become thick is finally evaporated to dryness and the resultant dyestuff powder ground. 420 parts of the corresponding substituted aluminum phthalocyanine trisulfonamide monosulfonic acid are thus obtained in the form of a greenish dark blue powder which dissolves in water or also in lacquer varnish with a deep yellowish-green color. It is especially suitable for dyeing leather or paper.

Similar dyestuffs are obtained in the same way from zinc or tin phthalocyanine and also the metal-free phthalocyanine.

What I claim is:

1. Phthalocyanine compounds of the general formula

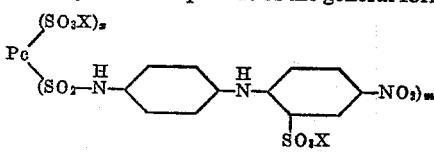

wherein Pc stands for the radical of a phthalocyanine selected from the class consisting of the metal-free phthalocyanine, the copper-, cobalt-, nickel-, iron-, chromium-, zinc-, aluminum- and tin-phthalocyanines and X for a member of the group consisting of hydrogen, ammonium, diethyl ammonium, ethanol ammonium, sodium and potassium, $n$ for an integer from 1 to 2 and $m$ for an integer from 1 to 3, the sum of the integers $n$ and $m$ being from 2 to 4.

2. A process for the production of dyestuffs of the phthalocyanine series which comprises reacting a member of the group consisting of the di-, tri- and tetrasulfochlorides of metal-free phthalocyanine, copper-, cobalt-, tin-, nickel-, iron-, chromium-, aluminum- and zinc-phthalocyanines and mixtures thereof with from one to three molecules, respectively, of 4-amino-4'-nitrodiphenylamine-2'-sulfonic acid in the presence of a member of the group consisting of aqueous ammonia, ammonium carbonate, lower alkyl amine, ethanolamine and alkali metal carbonate solutions.

3. Phthalocyanine compounds of the formula

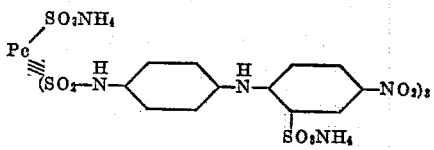

wherein Pc stands for copper phthalocyanine.

4. Phthalocyanine compounds of the formula

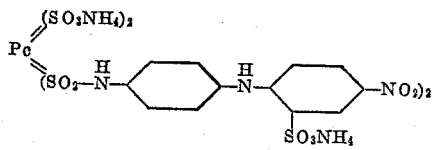

wherein Pc stands for copper phthalocyanine.

5. Phthalocyanine compounds of the formula

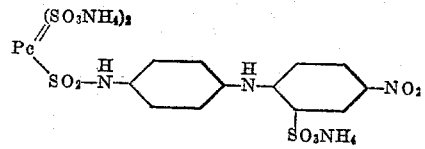

wherein Pc stands for copper phthalocyanine.

6. Phthalocyanine compounds of the formula

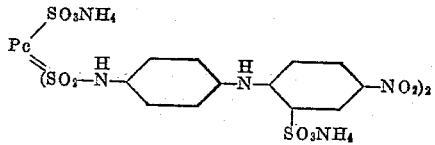

wherein Pc stands for copper phthalocyanine.

7. A mixture of the phthalocyanine compounds

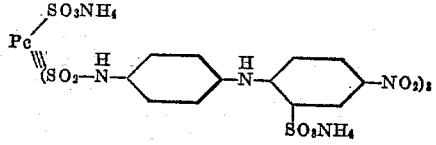

and

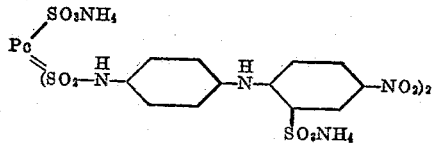

wherein Pc stands for copper phthalocyanine.

8. A mixture of the phthalocyanine compounds

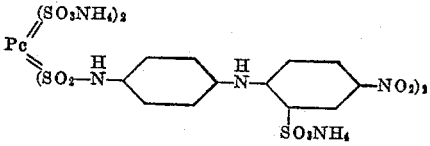

and

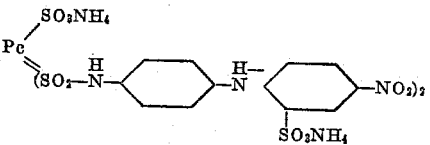

wherein Pc stands for copper phthalocyanine.

References Cited in the file of this patent
UNITED STATES PATENTS

| | | |
|---|---|---|
| 2,187,816 | Hartmann et al. | Jan. 23, 1940 |
| 2,300,572 | Hoyer et al. | Nov. 3, 1942 |
| 2,479,491 | Haddock et al. | Aug. 16, 1949 |
| 2,613,128 | Baumann et al. | Oct. 7, 1952 |
| 2,647,126 | Pugin | July 28, 1953 |